United States Patent
Hawkinson et al.

(10) Patent No.: US 7,778,111 B2
(45) Date of Patent: Aug. 17, 2010

(54) METHODS AND SYSTEMS FOR UNDERWATER NAVIGATION

(75) Inventors: Wesley J. Hawkinson, Chanhassen, MN (US); Kevin Sweeney, Minneapolis, MN (US); Randolph G. Hartman, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 287 days.

(21) Appl. No.: 12/051,740

(22) Filed: Mar. 19, 2008

(65) Prior Publication Data

US 2009/0238042 A1    Sep. 24, 2009

(51) Int. Cl.
*G01S 15/88* (2006.01)

(52) U.S. Cl. ..................................... 367/89; 367/131

(58) Field of Classification Search ............... 367/131, 367/128, 89
See application file for complete search history.

(56) References Cited

U.S. PATENT DOCUMENTS

| | | | |
|---|---|---|---|
| 3,351,896 A | 11/1967 | Rowlands | |
| 3,648,225 A | 3/1972 | Kritz et al. | |
| 3,818,425 A | 6/1974 | Peynaud et al. | |
| 4,244,026 A | 1/1981 | Dickey, Jr. | |
| 4,335,433 A | 6/1982 | Bauer et al. | |
| 4,891,762 A | 1/1990 | Chotiros | |
| 5,077,700 A | 12/1991 | Shaw et al. | |
| 5,381,151 A | 1/1995 | Boles et al. | |
| 6,037,893 A | 3/2000 | Lipman | |
| 6,778,467 B2 | 8/2004 | Tokuda et al. | |
| 7,139,647 B2 * | 11/2006 | Larsen | 701/216 |
| 7,151,483 B2 | 12/2006 | Dizaji et al. | |
| 7,161,527 B2 | 1/2007 | Vacanti | |
| 7,251,196 B1 | 7/2007 | Antonelli et al. | |
| 7,257,483 B2 | 8/2007 | Blain et al. | |
| 2002/0116126 A1 | 8/2002 | Lin | |

(Continued)

FOREIGN PATENT DOCUMENTS

JP    2007210402    8/2007

(Continued)

OTHER PUBLICATIONS

Alameda, Jr., "SEADeViL, A Totally Integrated Inertial Navigation System (INS) Solution", "Underwater Intervention Symposium, 2002", Mar. 2002, pp. 1-6.

(Continued)

*Primary Examiner*—Dan Pihulic
(74) *Attorney, Agent, or Firm*—Fogg & Powers LLC (57) ABSTRACT

A method for navigating underwater is disclosed. The method uses a navigation system to project a first velocity measurement along one or more signal beams having a second velocity measurement, where the second velocity measurement is related to at least one of the one or more signal beams. The method determines a position and location of an object associated with the navigation system based on a prediction of at least the second velocity measurement, and the navigation system is adjusted to perform within a prescribed measurement range based on a covariance of the first and second velocity measurements. The performance adjustments made in determining the position and location of the object are operable independent of the navigation system maintaining each of the signal beams due to one or more external environmental conditions.

20 Claims, 4 Drawing Sheets

U.S. PATENT DOCUMENTS

| | | | |
|---|---|---|---|
| 2006/0235583 A1 | 10/2006 | Larsen | |
| 2006/0287824 A1* | 12/2006 | Lin | 701/214 |
| 2007/0025184 A1 | 2/2007 | Scoca et al. | |
| 2007/0159922 A1 | 7/2007 | Zimmerman et al. | |
| 2009/0238042 A1* | 9/2009 | Hawkinson et al. | 367/131 |
| 2009/0287414 A1* | 11/2009 | Vickery | 367/6 |

FOREIGN PATENT DOCUMENTS

| | | |
|---|---|---|
| WO | 02084217 | 10/2002 |

OTHER PUBLICATIONS

Andreucci et al., "A Doppler Dumped Inertial Navigation System for Sara", Mar. 2004, pp. 1-4.

Larsen et al, "High Performance Autonomous Underwater Navigation", "Hydro International" Jan./Feb. 2002, pp. 1-6, vol. 6, No. 1, Publisher: GITC, Published in: The Netherlands.

Whitcomb et al., "Advances in Doppler Based Navigation of Underwater Robotic Vehicles", "Proceedings, IEEE International Conference on Robotics and Automation", 1999, pp. 399-406, vol. 1, Publisher: IEEE.

GB Patent Office "GB Office Action", May 13, 2009, Published in: GB.

* cited by examiner

METHODS AND SYSTEMS FOR UNDERWATER NAVIGATION

GOVERNMENT INTEREST STATEMENT

The U.S. Government may have certain rights in the present invention under contract no. N66001-07-C-2004 awarded by the United States Navy and the Defense Advanced Research Projects Agency (DARPA).

BACKGROUND

There are presently various implementations of underwater navigation systems in existence. For example, Doppler sonar devices that contain three or more signal beams are operable in a "Janus" configuration. In a typical Janus configuration, information from each of the signal beams is mathematically combined, and the beam-referenced Doppler velocity measurements are resolved into an orthogonal reference frame. This type of navigation, however, is subject to navigational drift, external environmental conditions, and other types of measurement errors which, when left unattended, lead to inaccurate position, depth, or distance estimates. For example, since two or more beams are combined to compute a single velocity component, errors occurring in the signal beam velocity measurements are not easily detectable, and the resultant reference frame velocity is less accurate. Moreover, velocity bandwidth limitations of the Doppler sonar typically result in erroneous velocity measurements due to signal beam loss or distortion. For example, if one or more of the signal beams become unavailable (for example, due to an obstruction or large attitude excursions causing the beam to not to "see" the bottom of the water body), the velocity measurements are unavailable.

Divers or underwater vehicles that traverse long distances completely underwater are unable to rely on above-surface navigational aids and require an accurate navigation system to arrive at their destination with minimum energy expenditure. There is a need in the art for improvements in underwater navigation.

SUMMARY

The following specification provides for at least one method and system for underwater navigation. In one embodiment, at least one method of navigating underwater uses an underwater navigation system to project a first velocity measurement along one or more signal beams having a second velocity measurement, where the second velocity measurement is related to at least one of the one or more signal beams. The method determines a position and location of an object associated with the navigation system based on a prediction of at least the second velocity measurement, and the navigation system is adjusted to perform within a prescribed measurement range based on a covariance of the first and second velocity measurements. The performance adjustments made in determining the position and location of the object are operable independent of the navigation system maintaining each of the signal beams due to one or more external environmental conditions.

BRIEF DESCRIPTION OF THE DRAWINGS

These and other features, aspects, and advantages are better understood with regard to the following description, appended claims, and accompanying drawings where:

Like reference numbers and designations in the various drawings indicate like elements.

DETAILED DESCRIPTION

Embodiments disclosed herein relate to at least one method and system for underwater navigation. In particular, the underwater navigation discussed herein relates to methods for measuring position and velocity while surveying underwater terrain or any similar terrain that requires continuous and accurate positioning and depth measurement information. For example, a system employing the methods of navigating discussed herein provide accurate and inexpensive navigation and depth measurement capabilities suitable for an individual diver or one or more forms of underwater vehicles.

In one embodiment, the system comprises a global positioning system (GPS) receiver, an inertial measurement unit (IMU) having one or more accelerometers, a magnetometer, a pressure sensor, and a Doppler sonar sensor having one or more sonar signal beams (for example, up to four signal beams). In typical underwater navigation applications, velocity measurements from the Doppler sonar sensor are available at a rate of up to 5 Hz, making dynamic oscillatory movements difficult to accurately track. Since the direction of the velocity vectors can change rapidly, greater accuracies result when the signal beam prediction methods discussed herein integrate the velocity at a relatively high frequency (for example, at an operating frequency of the IMU). In one embodiment of a navigation system discussed herein, the IMU operates at around 100 Hz, a bandwidth considered more ideal under dynamic operating conditions.

In addition, the navigation system provides a navigation correction function comprising a Kalman filter operable to filter various sensor inputs in at least one error reduction processing technique (for example, the Kalman filter corrects previous data points by "smoothing out" the measurement data). The data smoothing provided by the Kalman filter corrects past navigation results using navigation-aiding measurements from the present time to form the navigation correction function. In at least one implementation, the navigation system is operable with up to two Doppler sonar beams, using the pressure sensor for vertical height stabilization.

In at least one embodiment of the signal beam prediction methods discussed herein, integration of the multi-beam Doppler sonar sensor with the IMU involves having each beam of the Doppler sonar sensor individually considered a separate measurement. For example, a predicted value of the beam velocity is determined by projecting the velocity measurement from the IMU in the direction of the Doppler sonar beam. In addition, the beam velocity is compared against the predicted value of the beam velocity and supplied to the Kalman filter. In turn, the Kalman filter provides a determination of whether the measurement is substantially "reasonable" (for example, when the measurement is considered accurate given external environmental conditions substantially surrounding the navigation system). Moreover, the signal beam maintains the velocity projection in the beam direction, regardless of the external environmental conditions. For example, when a deviation such as encountering a school of fish or area of dense vegetation creates a "beam dropout" in at least one axis of measurement, the velocity projection is not affected and the navigation system continues to accurately track position without interruption.

Figure 1:
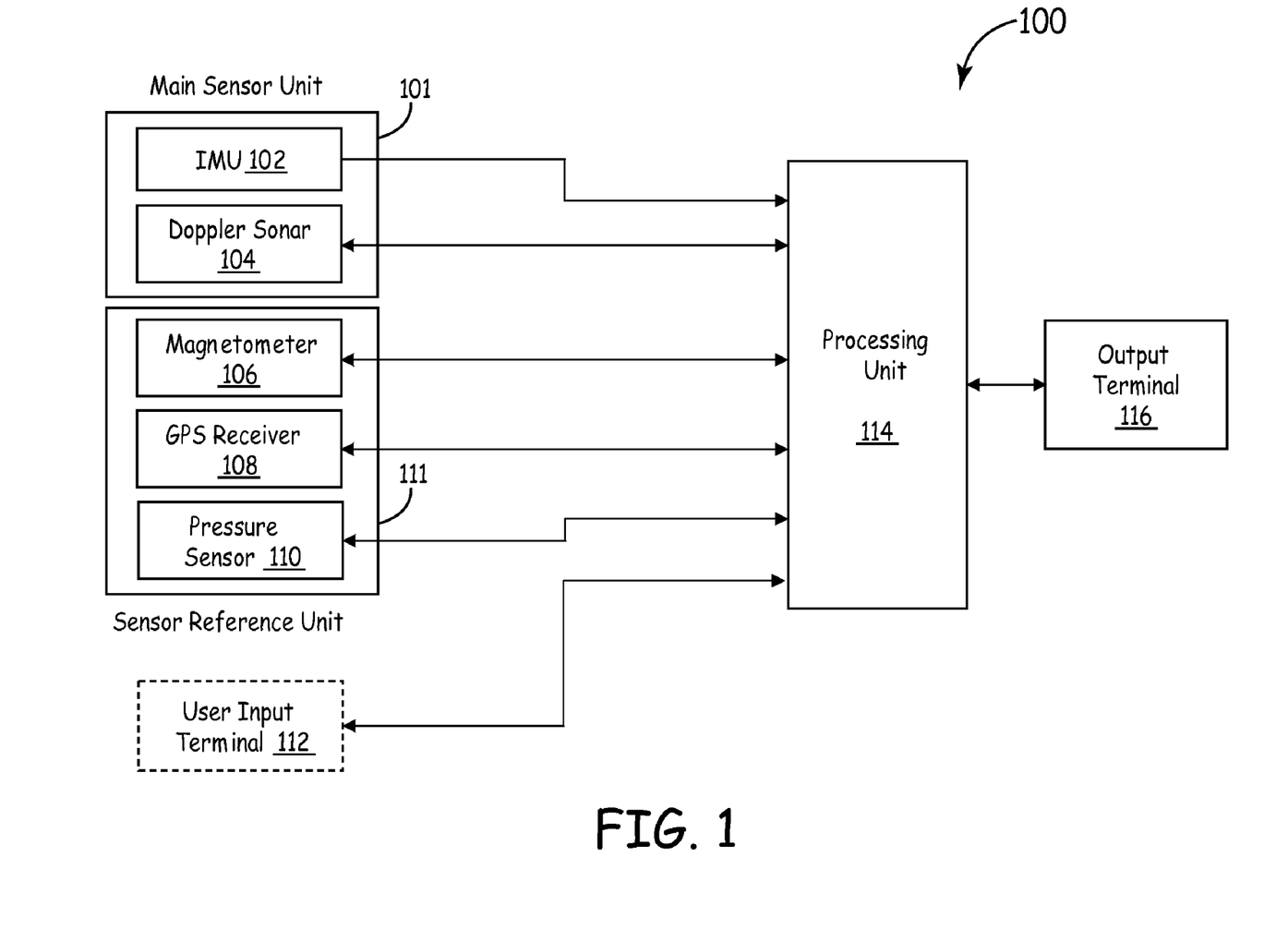
FIG. 1 is a block diagram of an embodiment of an underwater navigation system.

FIG. 1 is a block diagram of a navigation system 100. The system 100 comprises a processing unit 114, an output terminal 116 in operative communication with the processing unit 114, and a user input terminal 112 communicatively coupled to the processing unit 114. In the example embodiment of FIG. 1, the processing unit 114 comprises at least one of a microprocessor, a microcontroller, a field-programmable gate array (FPGA), a field-programmable object array (FPOA), a programmable logic device (PLD), or an application-specific integrated circuit (ASIC). In one implementation, the output terminal 116 is operable to display the processed inertial position, attitude, and velocity measurements of an object associated with the system 100 (for example, a diver or an underwater vehicle having the system 100). In at least one similar implementation, the user input terminal 112 is an optional component comprising a keyboard input device, a display input device, or the like.

The system 100 further comprises a main sensor unit 101 and a sensor reference unit 111, each of which is communicatively coupled to the processing unit 114. In one implementation, the main sensor unit comprises an inertial measurement unit (IMU) 102 and a Doppler sonar 104. The IMU 102 is configured to provide an inertial position and heading of an object associated with the navigation system, and the Doppler sonar 104 is operable to provide one or more sonar signal beams. For example, at least one signal beam configuration of the Doppler sonar 104 provides an orientation of the associated object based on a surface adjacent to the object. In one embodiment, the IMU 102 is a micro electromechanical systems (MEMS)-based IMU.

In the example embodiment of FIG. 1, the sensor reference unit 111 comprises a pressure sensor 110 configured as a first navigational aid, a magnetometer 106 configured as a second navigational aid, and a global positioning system (GPS) receiver 108. In one implementation, the GPS receiver 108 is operable to provide an initial position and velocity of the associated object at surface (sea) level. It is understood that the system 100 is capable of accommodating any appropriate number of navigational sensor types (for example, one or more IMUs 102, Doppler sonars 104, magnetometers 106, GPS receivers 108, pressure sensors 110, and the like) in a single system 100. In one implementation, the second navigational aid (the magnetometer 106) is operable to provide an orientation reference based on a surface magnetic field strength and direction.

In operation, the processing unit 114 is configured to predict the velocity of the associated object based on an inertial acceleration measured in the main sensor unit 101 and at least one of the sonar signal beams of the Doppler sonar 104. As discussed in further detail below with respect to FIG. 2, the processing unit 114 is further configured to determine the orientation of the at least one sonar signal beam within a prescribed range based on a measurement covariance of the inertial and sonar signal beam velocities, and to maintain the velocity prediction of the associated object exclusive of one or more external environmental conditions. For example, the first navigational aid (the pressure sensor 110) is operable to provide a vertical reference based on a gravitational compensation factor for underwater navigation. In one implementation, the system 100 is configured to perform within the prescribed measurement range using at least one of the sonar signal beams and the first navigational aid. For purposes of this description, it is noted that the covariance of the inertial and sonar velocities is considered a measure of how the inertial and sonar velocities vary together as an integrated signal beam projection from the system 100.

In the example embodiment of FIG. 1, the system 100 considers each sonar signal beam of the Doppler sonar 104 as individual measurements. For example, the predicted value of the sonar signal beam velocity is determined by projecting the inertial velocity provided by the IMU 102 along each of the sonar signal beams. The sonar signal beam velocity provided by each signal beam of the Doppler sonar 104 is compared with the predicted value of the projected velocity in the processing unit 114, as discussed in further detail below with respect to FIGS. 2 and 3. The processing unit 114 fixes the integrated velocity measurement in the direction of each sonar signal beam. Therefore, in situations where erroneous sonar beam information occurs in at least one axis of measurement, such as a dropout or encountering a school of fish or weeds, the system 100 continues to accurately track position without interruption. Moreover, if even a single signal beam is determined to be ineffective, the system 100 rejects the ineffective signal beam with near minimal impact.

Figure 2:
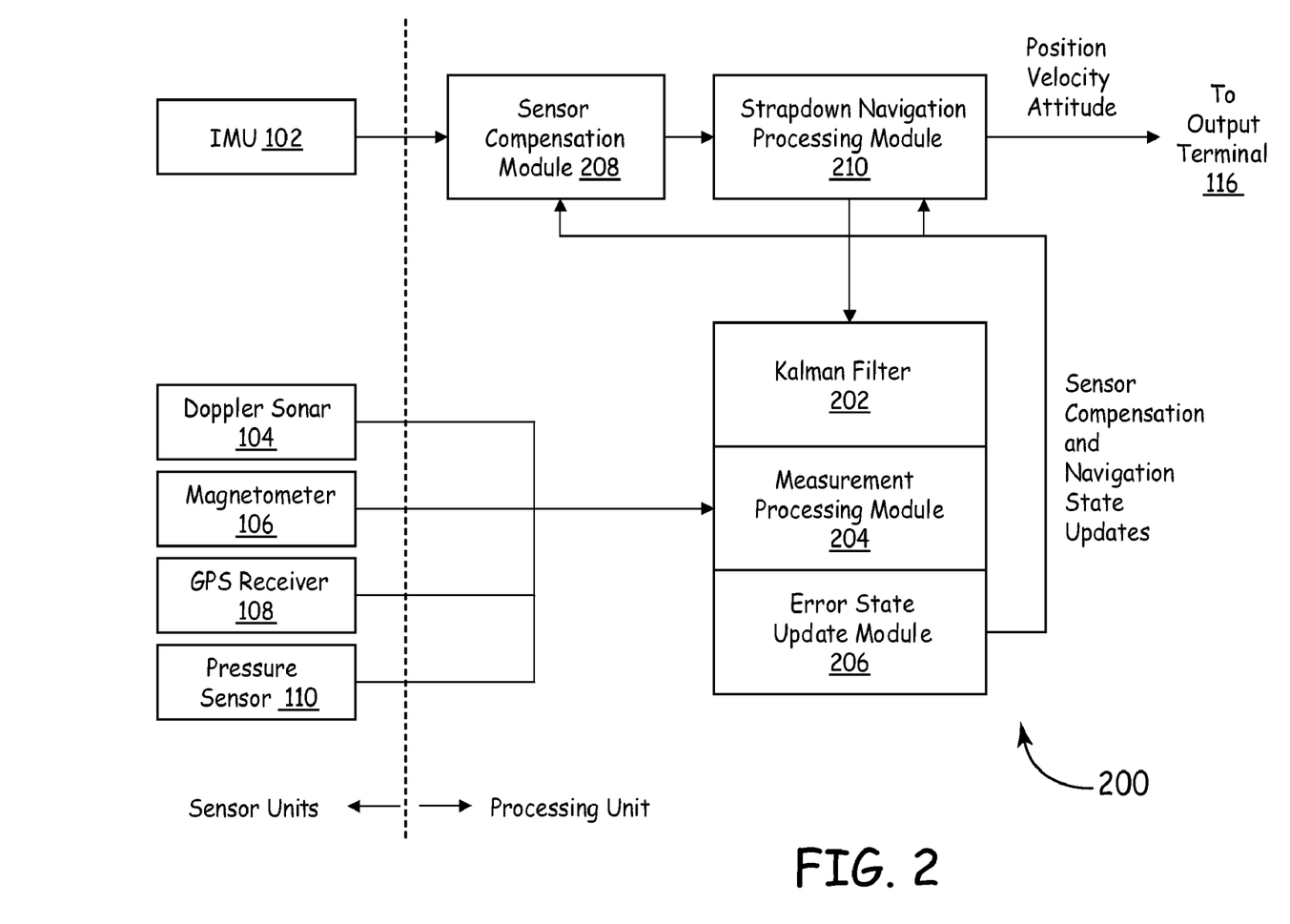
FIG. 2 is a block diagram of an embodiment of a measurement process in an underwater navigation system.

FIG. 2 is a block diagram of a process 200 for signal beam velocity predictions in a navigation system (for example, in the system 100 of FIG. 1). In the example embodiment of FIG. 2, the process 200 operates within the processing unit 114 of FIG. 1. The process 200 comprises a measurement processing module 204 in operative communication with a Kalman filter 202 and an error state update module 206. The process 200 further comprises a strapdown navigation processing module 210 in operative communication with the Kalman filter 202, and a sensor compensation module 208 in operative communication with the IMU 102 of FIG. 1 and the strapdown navigation processing module 210. In the example embodiment of FIG. 2, the strapdown navigation processing module 210 is operable to provide integrated inertial and Doppler sonar navigation data to the output terminal 116 of FIG. 1. The sensor compensation module 208 is configured to compensate prior navigation measurements from the IMU 102, the Kalman filter 202, and the measurement processing module 204 using navigation-aiding measurements provided in near real time, as discussed in further detail below. In one implementation, the measurement processing module 204 receives measurements from at least the Doppler sonar 104, the magnetometer 106, the GPS receiver 108, and the pressure sensor 110 of FIG. 1. Based on the compensated sensor measurements and navigation state updates from the error state update module 206, the sensor compensation module 208 provides the integrated inertial data of the object to the strapdown navigation processing module 210 as substantially constant navigation data. For example, the Kalman filter 202 is configured to compare the integrated inertial accelerations projected along at least one Doppler sonar signal beam direction to provide a velocity prediction for the navigation system 100, as discussed in further detail below. Moreover, the velocity prediction is uninhibited by one or more external environmental conditions substantially surrounding an object associated with the system 100.

The Kalman filter 202 blends together measurements from the sensors shown in FIGS. 1 and 2 to improve the navigation state estimate. For example, a blending of the navigational data from the IMU 102 (which has very good short term, high bandwidth characteristics, but undesirable long term characteristics) with Doppler velocity readings from the Doppler sonar 104 (which has low bandwidth but high long term accuracy) is advantageous. The Kalman filter 202 follows the typical form as expressed below with respect to Equation 1:

$$\tilde{P} = \Phi \hat{P} \Phi^T + GQG^T \qquad \text{(Equation 1)}$$

Where
P is the covariance matrix,
Φ is the state transition matrix, and
Q is the process noise density matrix, and
G is the process noise dynamic coupling matrix.

In Equation 1, the terms $\tilde{P}$ and $\hat{P}$ distinguish the values of the covariance matrix P after and before the time update, respectively. The last term on the right, $GQG^T$, accounts for the effect of process noise on the growth of the covariance matrix over time. The process noise dynamic coupling matrix G can be used to account for correlations among the components of the noise driving the various elements of the error state. In the example embodiment of FIG. 2, the measurement update step of the standard Kalman filter algorithm is illustrated as shown below with respect to Equations 2 and 3:

$$\hat{P} = \tilde{P} - KH\tilde{P} \qquad \text{(Equation 2)}$$

$$K = \tilde{P}H^T(H\tilde{P}H^T + R)^{-1} \qquad \text{(Equation 3)}$$

Where
K is the Kalman gain matrix,
H is the measurement sensitivity matrix, and
R is the measurement error covariance matrix.

In Equations 2 and 3, the terms $\tilde{P}$ and $\hat{P}$ distinguish the values before and after the measurement update, respectively. In addition, the gain K is used to update the estimate of the error state (designated as x) according to Equation 4 as illustrated below:

$$\hat{x} = \tilde{x} + K(\Delta y - H\tilde{x}) \qquad \text{(Equation 4)}$$

Where
Δy denotes the measurement residual.

In one implementation, the Kalman filter 202 compares the measurement residual, Δy, to the expected value of the residual, referred to herein as a measurement covariance. For example, when the individual beam measurement is compared against the measurement covariance, the ability to detect and reject incorrect measurements is formed as illustrated below with respect to Equations 5 and 6:

$$\hat{v}^b = C_n^b v^n \cdot u_x \qquad \text{(Equation 5)}$$

$$\Delta y = \hat{v}^b - v^b \qquad \text{(Equation 6)}$$

Where:
$\hat{v}^b$ is a predicted beam velocity vector,
$v^b$ is the measured beam velocity vector,
$C_n^b$ is the direction cosine matrix that relates the navigation frame to the beam frame
$v^n$ is the navigation frame velocity
$u_x$ is a unit vector along the beam X axis, and
· is the dot product operator.

As shown above with respect to Equations 5 and 6, the measurement residual treats all Doppler sonar beams as independent measurements. In one implementation, the process 200 compares the beam velocity to the value predicted by the strapdown navigation processing module 210 and allows the beam measurement residual to be directly compared to the measurement covariance, which is quantitatively defined by the $(H\tilde{P}H^T + R)$ term of Equation 3. For example, any deviations in excess of the statistically expected residual (for example, 3-sigma, or 3σ) results in a rejected measurement, improving the reliability and accuracy of navigation. In addition, each Doppler signal beam is processed in FIG. 2 as a separate measurement in the measurement sensitivity (H) matrix of the Kalman filter 202. Accordingly, any single Doppler signal beam is used individually, independently of other beams provided by the Doppler sonar 104. In one embodiment, the H matrix of the process 200 is formulated as the matrix of first order partial derivatives (for example, a Jacobian matrix) of the measurement residual matrix as illustrated above with respect to Equation 3. For purposes of this description, it is noted that the Jacobian matrix is used to integrate the inertial and sonar measurements when mathematically determining the navigation data provided by the IMU 102 and the Doppler sonar 104.

Figure 3:
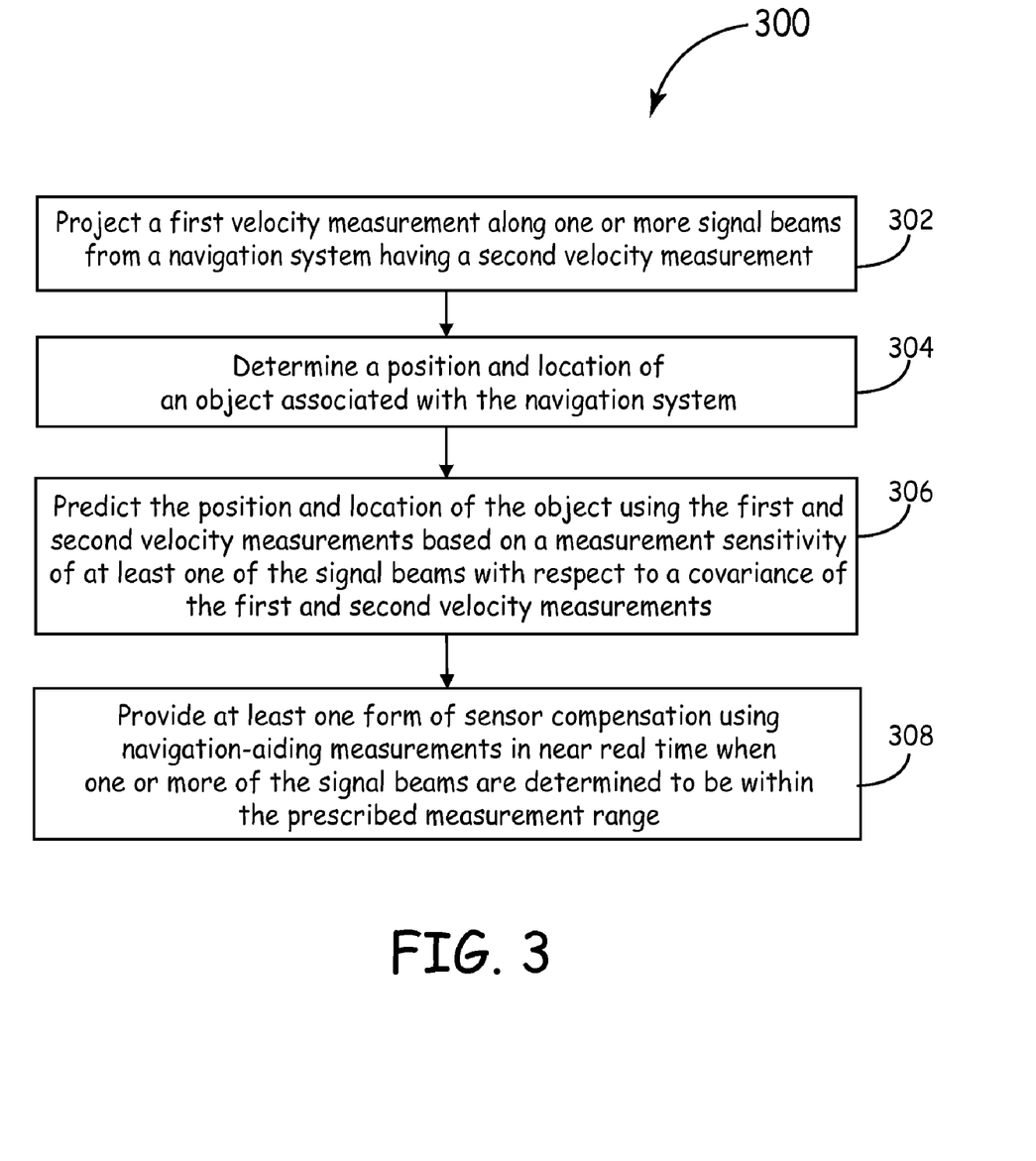
FIG. 3 is a flow diagram of an embodiment of a method for navigating underwater.

FIG. 3 is a flow diagram of a method 300 for navigating underwater. In the example embodiment of FIG. 3, the method 300 projects a first velocity measurement along one or more signal beams from a navigation system having a second velocity measurement (block 302). In the example embodiment of FIG. 3, the second velocity measurement relates to at least one of the one or more signal beams. The method 300 determines a position and location of an object associated with the navigation system based on a prediction of at least the second velocity measurement (block 304). In one implementation, the navigation system is adjusted to perform within a prescribed measurement range based on a covariance of the first and second velocity measurements. The method 300 predicts the position and location of the object using a second order integration of the source components of the first and second velocity measurements based on a measurement sensitivity of at least one of the signal beams with respect to the covariance of the first and second velocity measurements (block 306). In one embodiment, the method 300 provides the position and location predictions of the object as substantially constant navigation data to an output terminal of the navigation system. For example, the method 300 provides at least one form of sensor compensation using navigation-aiding measurements in near real time when one or more of the signal beams are determined to be within the prescribed measurement range (block 308).

In addition, the performance adjustments made in determining the position and location of the object are operable independent of the navigation system maintaining each of the signal beams due to one or more external environmental conditions. In one implementation, when projecting the first velocity measurement along the one or more signal beams, the method 300 isolates the first and second velocity measurements into inertial and sonar velocity components. In the same or at least one alternate implementation, when providing the substantially constant navigation data, the method 300 compares the prediction of the first and second velocity measurements with the second velocity measurement to adjust the covariance of the first and second velocity measurements in a direction of the at least one signal beam.

Figure 4:
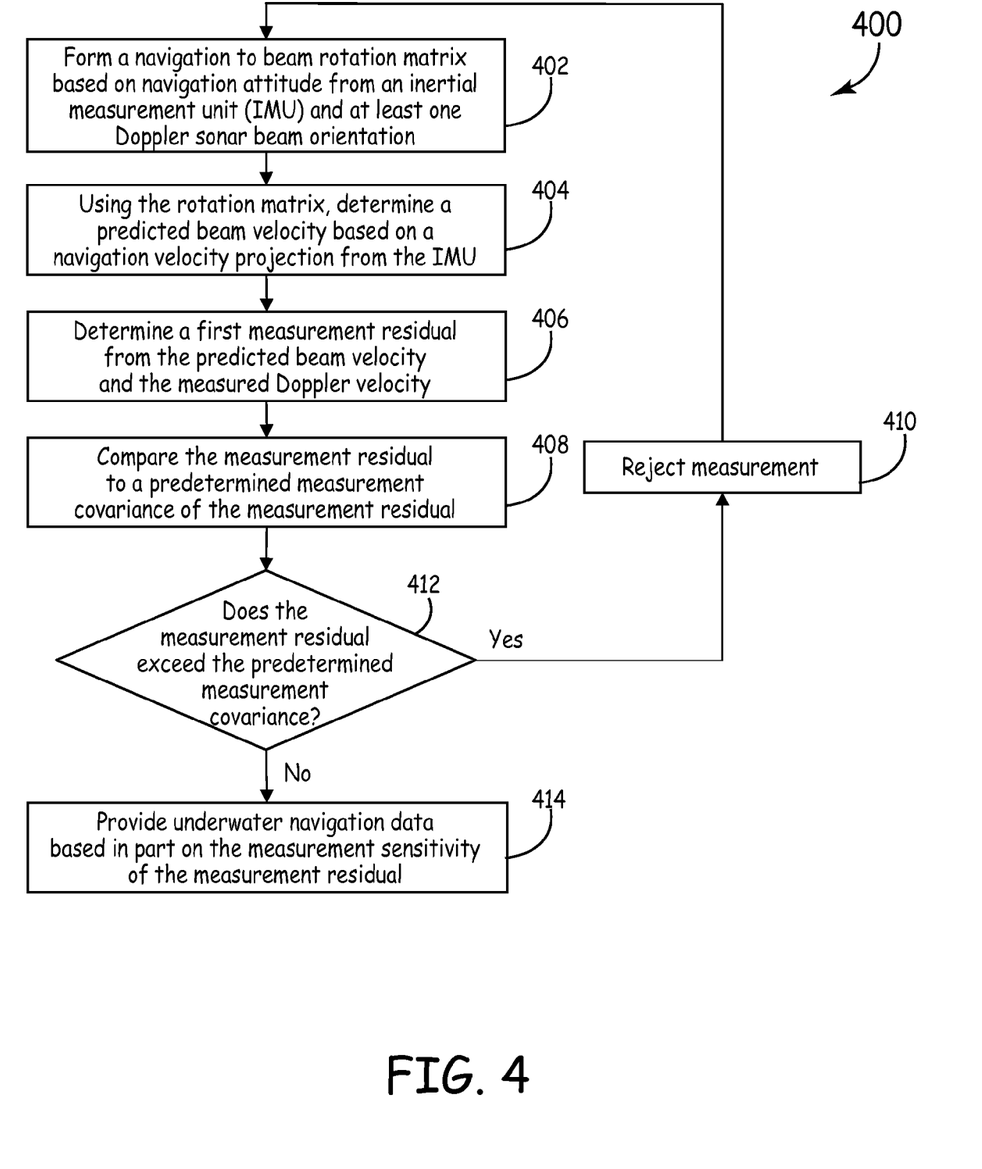
FIG. 4 is a flow diagram of an embodiment of a method of navigating underwater using signal beam velocity predictions.

FIG. 4 is a flow diagram of a method 400 of navigating underwater using signal beam velocity predictions. In the example embodiment of FIG. 4, the method 400 relates to underwater navigation using the system 100 of FIG. 1 and incorporating the signal beam velocity prediction processing discussed above with respect to FIG. 2. In one embodiment, the method 400 provides inertial navigation and Doppler sonar measurements of the system 100 as first and second velocity measurements, where the first velocity measurement projected along at least one signal beam orientation of the second velocity measurement as a navigation velocity projection. For example, the method 400 forms a navigation to beam rotation matrix based on an attitude measurement from the navigation system and prior knowledge of the direction and position of the Doppler beam (block 402). Using this rotation matrix, the method 400 determines a velocity prediction based on a projection of the inertial velocity from an inertial measurement unit portion of the system 100 (block 404). For example, the method 400 compares the navigation velocity projection with the orientation of the at least one signal beam to determine the velocity prediction of an object associated with the system 100, wherein the velocity prediction is uninhibited by one or more external environmental conditions substantially surrounding the object.

In one implementation, projecting the navigation velocity measurement comprises isolating the navigation and the sonar beam velocity measurements into inertial (first) and sonar (second) velocity measurements. As discussed above with respect to FIGS. 1 and 2, the first and second velocity measurements further include a reference frame velocity measurement within a prescribed measurement range of the system 100.

To determine an orientation and position of the object, the method shown in FIG. 4 determines a measurement residual from the predicted beam velocity and the Doppler sonar velocity (block 406). The method 400 compares the measurement residual to a predetermined measurement covariance of the measurement residual (block 408). When the measurement residual exceeds the predetermined measurement covariance (block 412), the method 400 rejects the velocity prediction (block 410). The method 400 attempts another prediction, beginning again at block 402. When the measurement residual is within the predetermined measurement covariance (for example, the measurement residual is considered acceptable), the method 400 provides underwater navigation data of the object using the signal beam velocity predictions, based in part on a measurement sensitivity of the accepted measurement residual (block 414). As discussed above, the navigation system uses the method 400 to maintain the velocity prediction of at least the first velocity measurement along the at least one signal beam independent of the one or more external environmental conditions. Moreover, the method 400 allows the system 100 to provide substantially constant navigation data in near real time from the output terminal 116.

The methods and techniques described herein may be implemented in a combination of digital electronic circuitry and software (or firmware) residing in a programmable processor. An apparatus embodying these techniques may include appropriate input and output devices, a programmable processor, and a storage medium tangibly embodying program instructions for execution by the programmable processor. A process embodying these techniques may be performed by a programmable processor executing a program of instructions that operates on input data and generates appropriate output data. The techniques may be implemented in one or more programs that are executable on a programmable system including at least one programmable processor coupled to receive data and instructions from (and to transmit data and instructions to) a data storage system, at least one input device, and at least one output device. Generally, a processor will receive instructions and data from at least one of a read only memory (ROM) and a random access memory (RAM). In addition, storage media suitable for tangibly embodying computer program instructions and data include all forms of non-volatile memory, and include by way of example, semiconductor memory devices; magnetic disks such as internal hard disks and removable disks; magneto-optical discs; optical discs, and other computer-readable media. Any of the foregoing may be supplemented by, or incorporated in, specially-designed application-specific integrated circuits (ASICs).

When information is transferred or provided over a network or another communications connection (either hardwired, wireless, or a combination of hardwired or wireless) to a computer, a computer properly views the connection as a computer-readable medium. Thus, any such connection is properly termed a computer-readable medium. Combinations of the above are also included within the scope of computer-readable media.

This description has been presented for purposes of illustration, and is not intended to be exhaustive or limited to the embodiments disclosed. Variations and modifications may occur, which fall within the scope of the following claims.

What is claimed is:

1. A method for navigating underwater, the method comprising:
   projecting a first velocity measurement along one or more signal beams from a navigation system having a second velocity measurement, the second velocity measurement related to at least one of the one or more signal beams;
   determining a position and location of an object associated with the navigation system based on a prediction of at least the second velocity measurement, the navigation system adjusted to perform within a prescribed measurement range based on a covariance of the first and second velocity measurements; and
   wherein the performance adjustments made in determining the position and location of the object are operable independent of the navigation system maintaining each of the signal beams due to one or more external environmental conditions.

2. The method of claim 1, wherein projecting the first velocity measurement comprises isolating the first and second velocity measurements into inertial and sonar velocity components.

3. The method of claim 1, wherein determining the position and location further comprises:
   predicting the position and location of the object using a second order integration of source components of the first velocity measurement; and
   based on a measurement sensitivity of at least one of the signal beams with respect to the covariance of the first and second velocity measurements, providing substantially constant navigation data to an output terminal of the navigation system.

4. The method of claim 3, wherein predicting the position and location comprises providing at least one form of sensor compensation using navigation-aiding measurements in near real time when one or more of the signal beams are determined to be within the prescribed measurement range.

5. The method of claim 3, wherein providing the substantially constant navigation data comprises comparing the prediction of the first and second velocity measurements with the second velocity measurement to adjust the covariance of the first and second velocity measurements in a direction of the at least one signal beam.

6. A computer-readable medium having executable instructions for implementing the method for navigating underwater according to claim 1.

7. A method of navigating underwater using signal beam velocity predictions, the method comprising:
   providing inertial navigation and Doppler sonar measurements as first and second velocity measurements of a navigation system, the first velocity measurement projected along at least one signal beam orientation of the second velocity measurement as a navigation velocity projection;

comparing the navigation velocity projection with the orientation of the at least one signal beam to determine a velocity prediction of an object associated with the navigation system, wherein the velocity prediction is uninhibited by one or more external environmental conditions substantially surrounding the object; and determining an orientation and position of the object within a prescribed measurement range of the navigation system based in part on a measurement residual of the first and second velocity measurements.

8. The method of claim 7, wherein providing the inertial navigation and the Doppler sonar measurements as the first and second velocity measurements further comprises determining a reference frame velocity within the prescribed measurement range of the navigation system.

9. The method of claim 7, wherein comparing the navigation velocity projection with the orientation of the at least one signal beam comprises comparing the measurement residual of the first velocity measurement with a predetermined measurement covariance of the second velocity measurement.

10. The method of claim 7, wherein determining the orientation and position of the object further comprises:

maintaining the projection of at least the first velocity measurement along the at least one signal beam due to the one or more external environmental conditions; and providing substantially constant navigation data in near real time from an output terminal of the navigation system.

11. A computer-readable medium having executable instructions for implementing the method of navigating underwater using signal beam velocity predictions according to claim 7.

12. A navigation system, comprising:

a main sensor unit including:

an inertial measurement unit configured to provide an inertial position and heading of an object associated with the navigation system; and a Doppler sonar operable to provide one or more sonar signal beams, the Doppler sonar configured to provide an orientation for the associated object based on a surface adjacent to the object; and a processing unit configured to predict the velocity of the associated object based on an inertial acceleration measured in the main sensor unit and at least one of the sonar signal beams of the Doppler sonar, the processing unit further configured to:

determine the orientation of the at least one sonar signal beam within a prescribed range based on a measurement covariance of inertial and sonar signal beam velocities; and maintain the velocity prediction of the associated object exclusive of one or more external environmental conditions.

13. The navigation system of claim 12, further comprising a sensor reference unit, the sensor reference unit including:

a pressure sensor configured as a first navigational aid;

a magnetometer configured as a second navigational aid; and a global positioning system (GPS) receiver, the GPS receiver operable to provide an initial orientation of the associated object.

14. The navigation system of claim 13, wherein the first navigational aid is operable to provide a vertical reference based on a gravitational compensation factor for underwater navigation.

15. The navigation system of claim 14, wherein the system is configured to perform within the prescribed range using at least one of the sonar signal beams and the first navigational aid.

16. The navigation system of claim 13, wherein the second navigational aid is operable to provide an orientation reference based on a surface magnetic field strength.

17. The navigation system of claim 12, wherein the processing unit further comprises:

a Kalman filter;

a measurement processing module in operative communication with the Kalman filter;

a strapdown navigation module in operative communication with the Kalman filter, the strapdown navigation module operable to provide integrated inertial and Doppler sonar navigation data of the associated object; and a sensor compensation module in operative communication with the inertial measurement unit and the strapdown navigation module, the sensor compensation module configured to:

compensate prior navigation measurements from the main sensor module and the measurement processing module using navigation-aiding measurements provided in near real time; and based on a measurement sensitivity of the at least one sonar signal beam, provide the integrated inertial and Doppler sonar navigation data of the associated object to the strapdown navigation module as substantially constant navigation data.

18. The navigation system of claim 12, wherein the inertial measurement unit is a micro electro-mechanical systems (MEMS)-based inertial measurement unit.

19. The navigation system of claim 12, further comprising:

a user input terminal, and an output terminal operable to display the processed inertial position, attitude, and velocity measurements of the associated object.

20. The navigation system of claim 12, wherein the navigation system is an underwater navigation system.

* * * * *